H. A. SEDGWICK.
SALT AND PEPPER BOX.
APPLICATION FILED MAY 12, 1908.

917,804.

Patented Apr. 13, 1909.

WITNESSES:
Arthur P. Marr
S. H. Stadder

INVENTOR
Henrietta A. Sedgwick
BY
Thomas David Stelson
ATTORNEY

UNITED STATES PATENT OFFICE.

HENRIETTA A. SEDGWICK, OF NEW YORK, N. Y.

SALT AND PEPPER BOX.

No. 917,804.

Specification of Letters Patent.

Patented April 13, 1909.

Application filed May 12, 1908. Serial No. 432,461.

*To all whom it may concern:*

Be it known that I, HENRIETTA A. SEDGWICK, a citizen of the United States, residing in the borough of Brooklyn, in the city and State of New York, have invented a certain new and useful Improvement in Salt and Pepper Boxes; and I do hereby declare that the following is a full and exact description thereof, prepared with a view to obtaining Letters Patent of the United States therefor.

The invention is of a nature to encourage the formation and enjoyment of picnic parties;—it may serve usefully with large well provisioned and expensive parties exploring rough country with equipments to be out several days or even weeks, or for exceedingly unpretentious parties to be out only a few hours. Its whole function is to carry a supply of salt and pepper and have it always ready.

I have discovered that a neat and very convenient box of maple or other bright wood may be made with little labor by hand or by machinery and supplied with the two principal seasonings, salt and pepper, just sufficiently intimate without mixing ready for instant use in any desired proportions.

The following is what I consider the best means of carrying out the invention.

The accompanying drawings form a part of this specification.

Figure 1:
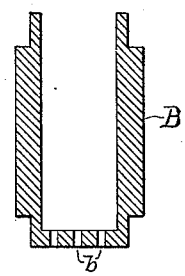
Figure 2:
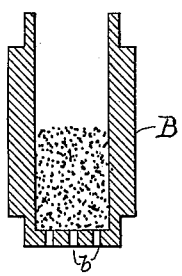
Figure 3:
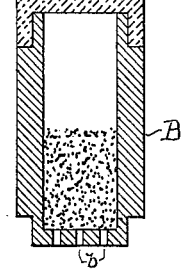
Figure 4:
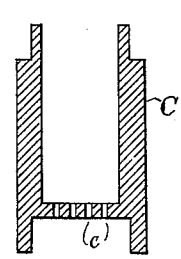
Figure 5:
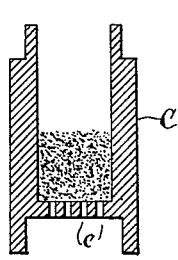
Figure 6:
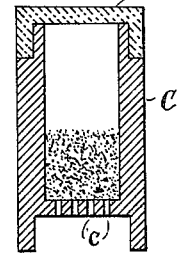
Figure 7:
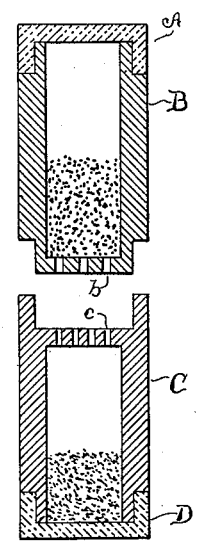
Figure 8:
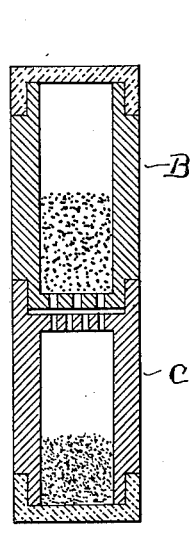
Figure 9:
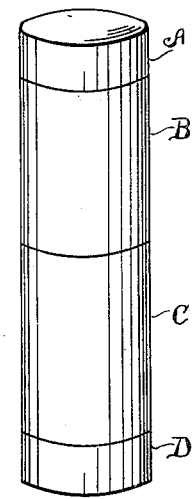

Figure 1 is the upper part as shown, it carries the grosser grains,—the salt. Fig. 2 shows it loaded. Fig. 3 shows it capped. Fig. 4 shows the lower part used to carry the pepper. Fig. 5 shows it loaded. Fig. 6 shows it capped. All these and the next two Figs. 7 and 8 show central longitudinal sections. Fig. 7 shows the top part or the salt box in the act of being applied upon its mate the lower part or the pepper box. Fig. 8 shows them after they have been applied together and adhering in the obvious manner, the two boxes are ready to be handled as a unit. The united parts can be rolled or variously treated as convenience or fancy may suggest. Fig. 9 is a perspective view of the compound box in its filled condition.

Similar letters of reference indicate like parts in all the figures where they appear.

In turning or otherwise operating to produce the parts, I prefer to make the exterior surface of one longer than the other so as to remove all doubt as to which end has certain contents. As shown the long one is devoted to the holding of pepper. When the two boxes are separated they will stand of equal height but they are then well distinguished in that the pepper-box C is of full diameter at the top (see Fig. 7) while the other is contracted at the top, (see Fig. 3 inverted).

A set of small smoothly-cutting drills not shown produce the sprinkling holes $b$ in the part B,—the short part which carries the salt,—and a nearly similar set but a greater number of smaller drills not shown produce the sprinkling holes $c$ in the other part,—the longer part which carries the pepper.

I provide nicely fitting covers A and D to match tightly over the apertures through which the parts B and C are filled. After these parts are filled with the desired material, which in this case is salt and pepper, the covers are placed in position and the whole is ready for use, or the parts B and C may be matched together and the whole packed away for use at some future time.

The liberal supply afforded in the small portions of wood remaining unused in many large manufacturing industries and the fact that the parts can be shaped automatically by accurate and swift machinery brings the cost of these several parts and of the assembled seasoning holders down to a very low figure;—and the strength and the capacity to endure severe usage makes them serviceable under conditions in which ordinary equipments could not serve at all.

I attach importance to the plain cylindrical form or in other words the uniform external diameter for the reason among others that it allows the two boxes when desired to be held together in one hand and shaken simultaneously.

Modifications may be made without departing from the principle or sacrificing the advantages of the invention.

I can use the device for other purposes than food and seasoning therefor.

I attach importance to the economy of my device and to the abandon with which the compound boxes may be distributed without any care to gather them again.

The small spaces between the perforated ends B$b$ and C$c$ rapidly choke with the pepper from one or the salt from the other whichever chances to be uppermost when the device is filled. The mixing of the two condiments is not objectionable in the very small extent to which it is here carried, and each of the articles however dry and fine is retained against absolute loss.

I claim as my invention:

1. A salt and pepper holder in four separable parts, socketed together in line, the two interior parts constituting tubes partly separated at their joining ends by two perforated partitions formed one on each part, the whole adapted to serve as two boxes or one at will.

2. A salt and pepper holder composed of wood in four separable parts, socketed together in line, the two interior parts constituting tubes provided at their joining ends with perforated closures, and the remaining parts forming covers tightly closing the outer ends respectively.

3. A salt and pepper holder composed of wood in separable parts, of uniform external diameter, the main parts B and C joined tightly together in line with their contents separated when not in active use by perforated partitions lying close together, in combination with a cover making a tight closing at each end, all adapted to serve as herein specified.

Signed at New York, N. Y., this 5th day of May, 1908.

HENRIETTA A. SEDGWICK.

Witnesses:
LOUIS F. BRAUN,
ARTHUR P. MARR.